United States Patent
Johansson et al.

(10) Patent No.: US 11,433,731 B2
(45) Date of Patent: Sep. 6, 2022

(54) METHOD FOR DETERMINING A FUNCTIONAL STATUS OF A VEHICLE SHOCK ABSORBER ARRANGEMENT

(71) Applicant: Volvo Truck Corporation, Gothenburg (SE)

(72) Inventors: Per Johansson, Gothenburg (SE); Thomas Andersson, Onsala (SE); Jesper Turesson, Gothenburg (SE); Anders Petersson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 317 days.

(21) Appl. No.: 16/766,526

(22) PCT Filed: Nov. 28, 2017

(86) PCT No.: PCT/EP2017/080688
§ 371 (c)(1),
(2) Date: May 22, 2020

(87) PCT Pub. No.: WO2019/105532
PCT Pub. Date: Jun. 6, 2019

(65) Prior Publication Data
US 2020/0346510 A1 Nov. 5, 2020

(51) Int. Cl.
*B60G 17/08* (2006.01)
*B60G 17/018* (2006.01)
*G01M 17/04* (2006.01)

(52) U.S. Cl.
CPC .......... *B60G 17/08* (2013.01); *B60G 17/018* (2013.01); *B60G 2202/11* (2013.01);
(Continued)

(58) Field of Classification Search
CPC .. B60G 17/08; B60G 17/018; B60G 2202/11; B60G 2202/152; B60G 2202/24;
(Continued)

(56) References Cited

U.S. PATENT DOCUMENTS

| | | | | |
|---|---|---|---|---|
| 5,648,902 A | * | 7/1997 | Honda | G01M 17/04 701/1 |
| 5,756,877 A | * | 5/1998 | Nozaki | G01M 17/04 73/11.08 |

(Continued)

FOREIGN PATENT DOCUMENTS

| | | |
|---|---|---|
| DE | 102012218780 A1 | 4/2014 |
| EP | 0220115 A1 | 4/1987 |

(Continued)

OTHER PUBLICATIONS

International Search Report and Written Opinion for International Patent Application No. PCT/EP2017/080688, dated Aug. 1, 2018, 10 pages.

*Primary Examiner* — Darlene P Condra
(74) *Attorney, Agent, or Firm* — Withrow & Terranova, PLLC

(57) ABSTRACT

The present invention relates to a method for determining a functional status of a vehicle shock absorber arrangement (100). The method determines a difference between force values during compression and expansion of the vehicle shock absorber arrangement (100), whereby the shock absorber arrangement (100) can be determined to be degraded if the difference is below a predetermined threshold.

13 Claims, 5 Drawing Sheets

(52) U.S. Cl.
CPC .... *B60G 2202/152* (2013.01); *B60G 2202/24* (2013.01); *B60G 2400/252* (2013.01); *B60G 2400/60* (2013.01); *B60G 2400/91* (2013.01); *G01M 17/04* (2013.01)

(58) Field of Classification Search
CPC .......... B60G 2400/252; B60G 2400/60; B60G 2400/91; B60G 2600/044; B60G 2800/20; B60G 2800/70; B60G 2800/802; B60G 17/0182; B60G 17/017; G01M 17/04
See application file for complete search history.

(56) References Cited

U.S. PATENT DOCUMENTS

| | | | | |
|---|---|---|---|---|
| 6,360,580 | B1* | 3/2002 | Muller | G01M 17/04 73/11.04 |
| 7,191,637 | B2* | 3/2007 | Sonnenburg | G01M 17/04 73/11.04 |
| 8,116,938 | B2* | 2/2012 | Itagaki | B60G 17/0182 280/5.515 |
| 2002/0010533 | A1* | 1/2002 | Wimmer | G01M 17/04 701/31.4 |
| 2004/0148074 | A1* | 7/2004 | Hessmert | B60G 17/0185 280/5.5 |
| 2006/0116799 | A1 | 6/2006 | Mahlo | |
| 2010/0211253 | A1 | 8/2010 | Morais Dos Santos et al. | |
| 2015/0224845 | A1* | 8/2015 | Anderson | B60G 13/14 701/37 |
| 2017/0032592 | A1 | 2/2017 | Lu et al. | |
| 2018/0356312 | A1* | 12/2018 | Weiß | G01M 17/04 |
| 2019/0102959 | A1* | 4/2019 | Saylor | G07C 5/0825 |
| 2019/0353561 | A1* | 11/2019 | Landolsi | B60G 17/0195 |
| 2020/0258321 | A1* | 8/2020 | Kunkel | G07C 5/0808 |
| 2021/0023904 | A1* | 1/2021 | Kasuya | B60G 17/019 |
| 2021/0291611 | A1* | 9/2021 | Bruno | G01M 17/04 |

FOREIGN PATENT DOCUMENTS

| | | |
|---|---|---|
| FR | 2588658 A1 | 4/1987 |
| FR | 2834338 A1 | 7/2003 |

* cited by examiner

METHOD FOR DETERMINING A FUNCTIONAL STATUS OF A VEHICLE SHOCK ABSORBER ARRANGEMENT

This application is a 35 USC 371 national phase filing of International Application No. PCT/EP2017/080688, filed Nov. 28, 2017, the disclosure of which is incorporated herein by reference in its entirety.

TECHNICAL FIELD

The present invention relates to a method for determining a functional status of a vehicle shock absorber arrangement. The invention also relates to a corresponding vehicle system comprising such a vehicle shock absorber arrangement. The invention is applicable on vehicles, in particularly low, medium and heavy duty vehicles commonly referred to as trucks. Although the invention will mainly be described in relation to a truck, it may also be applicable for other type of vehicles provided with vehicle shock absorber arrangements.

BACKGROUND

In connection to low-, medium and heavy duty vehicles, also commonly referred to as trucks, shock absorber arrangements are commonly mounted between the wheel axle and the vehicle chassis in order to absorb and damp the vibrations caused by, for example, the road surface at which the vehicle is driving. Typically, the shock absorber is arranged between a spring suspension and e.g. the wheel axle or the chassis of the vehicle.

During operation of the vehicle, the shock absorber will eventually be degraded and not provide the same damping characteristics as a new and unused shock absorber. The level of degradation is often associated with the specific operation exposed to the shock absorber. When the shock absorber arrangement is degraded to a certain extent, it must be replaced with a new one for providing sufficient shock absorption to the vehicle.

However, it may be difficult to properly determine the degradation of the shock absorber which often results in that the shock absorber is replaced with a new one based on certain pre-set intervals. Hereby, there is a risk that the shock absorber is replaced with a new one before it is necessary to do so, and a properly functioning shock absorber is thus unnecessarily discarded.

There is thus a need to be able to properly determine the functional status of the shock absorber arrangement for improved prediction of e.g. aging of the shock absorber arrangement.

SUMMARY

It is an object of the present invention to provide a method for determining a functional status of a vehicle shock absorber arrangement which at least partially overcomes the above described deficiencies. This is achieved by a method according to claim 1.

According to a first aspect of the present invention, there is provided a method for determining a functional status of a vehicle shock absorber arrangement arranged between a frame and a wheel axle of a vehicle, the vehicle shock absorber arrangement being compressible and expandable during operation for absorbing motions from the wheel axle, wherein the method comprises the steps of determining a first force value of an external force exposed to said shock absorber arrangement, the first force value being determined when the shock absorber arrangement is arranged at a first position during compression of the shock absorber arrangement; determining a second force value of the external force exposed to said shock absorber arrangement, the second force value being determined when the shock absorber arrangement is arranged at the first position during expansion of the shock absorber arrangement; determining a difference between the first and second force values; comparing the difference between the first and second force values with a predetermined threshold; and determining that the shock absorber arrangement is degraded if the difference between the first and second force values is below the predetermined threshold.

The wording "functional status" of the shock absorber arrangement should be understood to mean a level of functionality for the shock absorber arrangement, i.e. a measure of the possibility to absorb and damp vibrations caused during operation. The functional status may thus be a level of degradation of the shock absorber, i.e. a measure of aging.

Furthermore, the external force should be readily understood to also include the determination of an acceleration of at least portions of the vehicle body caused by the motion during operation of the vehicle. Hence, the force, which is based on the acceleration, can be determined. Hence, the unsprung mass of the vehicle can be used for determining the force. Moreover, the first and second force values may also be determined by respective mean values over time.

The present invention is based on the insight that the force response of a shock absorber during loading and unloading can be used for determining degradation of the shock absorber. Hence, it has been realized that the so called hysteresis effect has an impact on the function of the shock absorber, whereby the hysteresis can be evaluated and analyzed for determining degradation of the shock absorber. An advantage is thus that the dynamic response of the shock absorber can be determined during dynamic loading and unloading thereof, which can be used for determining the damping effect obtainable by the shock absorber. The dynamic response, i.e. how the force exposed to shock absorber varies during loading and unloading, can therefore be compared to a predetermined threshold level in order to determine if the shock absorber is degraded, and preferably to which extent the shock absorber is degraded. The predetermined threshold is preferably based on previous measurements made for a substantially new and unused shock absorber. The predetermined threshold is in such a case measured for a shock absorber which is known to function as desired. Such measurements can thus be "stored" in a control unit for use during operation.

Furthermore, the above described method may preferably be used and executed during operation of the vehicle. The operator of the vehicle can thus receive an indication when the shock absorber is degraded to a certain level at which it needs replacement. Accordingly, the utilization of the shock absorber can be improved and the risk of operating the vehicle with an aged shock absorber can be reduced. Hence, the operational lifetime of vibration sensitive components can also be improved.

According to an example embodiment, the shock absorber arrangement may comprise a piston movable within a shock absorber housing of the shock absorber arrangement, wherein the first position of the shock absorber arrangement is a first piston position of the piston within the shock absorber housing.

The position of the piston may, for example, be determined by the use of e.g. a sensor or the like. The sensor may either be arranged within the shock absorber housing, or at a position outside the shock absorber housing. It should thus be readily understood that the position of the piston may be determined through various approaches. The position may also be determined based on a position of e.g. the chassis relative one of the wheel axles of the vehicle, whereby the position of the piston can be implicitly determined.

According to an example embodiment, the piston may be movable within the shock absorber housing between respective piston end positions within the shock absorber housing, wherein the first piston position is a non-end position within the shock-absorber housing.

The end positions within the shock absorber should be understood as the positions where the shock absorber is compressed to a minimum extent and expanded to a maximum extent, respectively. The end positions are hence the "turning positions" of the pistons within the shock absorber housing.

The value of the force may vary relatively drastically in the vicinity of the end positions. Hence, determining the force value at non-end positions may give a more reliable force value. Also, it will be easier to determine that the force value is received for a shock absorber exposed to compression or for a shock absorber exposed to expansion.

According to an example embodiment, the method may further comprise the steps of determining a position of the shock absorber arrangement when the vehicle is arranged at stand still; and setting the first position to the position of the shock absorber arrangement at vehicle stand still.

The position at stand still should be understood to mean that the vehicle is standing still, with the engine turned on and the vehicle is ready for operation. During subsequent operation of the vehicle, the piston will thus oscillate around the "stand still position" which will constitute a reference position for determining the force during compression and expansion of the shock absorber.

According to an example embodiment, the shock absorber arrangement may be connected to a vehicle spring arrangement, wherein the method may further comprise the steps of determining a characteristics of the vehicle spring arrangement; determining the predetermined threshold based on the characteristics of the vehicle spring arrangement; and comparing the difference between the first and second force values with the predetermined threshold specific for the characteristics of the vehicle spring arrangement.

The characteristics of the vehicle spring arrangement should be construed as a functional status of the spring arrangement. Various spring arrangements may be used as will be described below. For e.g. a spring arrangement in the form of a flexible bellows, the characteristic may relate to the air pressure within the flexible bellows.

An advantage is thus that further aspects that can influence the behavior of the shock absorber arrangement can be taken into account when determining if the shock absorber is degraded. Accordingly, when determining the first and second force values, these may vary depending on the characteristic of the vehicle spring arrangement. Hence, an improved accuracy when evaluating measured force values is achieved. As stated above, the predetermined threshold is preferably specific for the specific characteristics of the vehicle spring arrangement. Hence, the predetermined threshold may vary depending on the specific characteristics of the vehicle spring arrangement. When comparing the force values, this comparison should be made for a shock absorber connected to a vehicle spring arrangement having substantially the same spring characteristic as for the measurement.

According to an example embodiment, the spring arrangement may comprise a flexible bellows and the characteristics of the spring arrangement may be a measured gas pressure level within the flexible bellows.

When comparing the difference between the first and second force values, this may thus preferably be made for a previous measurement with the same, or at least with similar gas pressure levels within the flexible bellows. Hence, the predetermined threshold may be based on measurements made for a non-degraded shock absorber arrangement connected to a flexible bellows arranged with a specific gas pressure level. The predetermined threshold may be based on previous measurements which are stored in a memory for later use thereof.

The flexible bellows may be connected between the vehicle frame and the shock absorber. In such case, the shock absorber is thus arranged between the wheel axle and flexible bellows. The shock absorber may of course also be arranged between the shock absorber and the wheel axle such that the shock absorber is connected to the vehicle frame.

According to an example embodiment, the spring arrangement may comprise a leaf spring arrangement and the characteristics of the spring arrangement may be a vertical displacement position of the leaf spring arrangement.

Hereby, a level sensor or the like is preferably used for determining the vertical position of the leaf spring arrangement. Similar to the situation with the flexible bellows, the predetermined threshold may be based on measurements made for a non-degraded shock absorber arrangement connected to a leaf spring arrangement arranged at specific displacements. Thus, when determining the first and second force values of the shock absorber, also a vertical displacement of the leaf spring arrangement is determined, whereby the difference between the first and second force values are compared to a threshold determined for a similar vertical displacement of the leaf spring arrangement.

According to an example embodiment, the external load may be an oscillating force acting on the shock absorber arrangement, wherein the method may further comprise the steps of determining a frequency level of the oscillating force acting on the shock absorber arrangement; determining the predetermined threshold based on the frequency level of the oscillating force; and comparing the difference between the first and second force values with the predetermined threshold specific for the frequency level of the oscillating force.

The force values at specific positions may vary depending on the specific frequency of the load exposed to the shock absorber. Hereby, a still further accuracy may be achieved when determining if the shock absorber is degraded. Preferably, the predetermined threshold is also based on the frequency level. Other vehicle parameters, such as e.g. vehicle speed, road topography, etc., may be determined as well for even further improving the accuracy of the measurement. In such a case, the comparison should be made for a substantially similar driving situation.

According to an example embodiment, a plurality of first force values may be determined for a plurality of positions of the shock absorber arrangement during compression of the shock absorber arrangement, and a plurality of second force values may be determined for the same plurality of positions of the shock absorber arrangement during expansion of the shock absorber arrangement.

By determining force values at a plurality of positions, further positions of evaluation are received whereby the accuracy of measurements can be even further improved. In detail, force values may be received for each position of the shock absorber during the compression and expansion phase.

According to a second aspect, there is provided a vehicle suspension system of a vehicle, the suspension system comprising vehicle shock absorber arrangement connectable between a frame and a wheel axle of a vehicle, the vehicle shock absorber arrangement being compressible and expandable during operation for absorbing motions from the wheel axle; and a control unit connected to the vehicle shock absorber arrangement, wherein the control unit is configured to determine a first force value of an external force exposed to said shock absorber arrangement, the first force value being determined when the shock absorber arrangement is arranged at a first position during compression of the shock absorber arrangement; determine a second force value of the external force exposed to said shock absorber arrangement, the second force value being determined when the shock absorber arrangement is arranged at the first position during expansion of the shock absorber arrangement; determine a difference between the first and second force values; compare the difference between the first and second force values with a predetermined threshold; and determine that the shock absorber arrangement is degraded if the difference between the first and second force values is below the predetermined threshold.

According to an example embodiment, the vehicle suspension system may further comprise a spring arrangement connectable between the vehicle shock absorber arrangement and the frame of the vehicle, and a spring sensor connected to the control unit and arranged to detect a characteristic of the spring arrangement, wherein the control unit may be further configured to receive a signal from the spring sensor indicative of the characteristic of the spring arrangement; and determine the predetermined threshold based on the characteristic of the spring arrangement.

The spring sensor may for example be a level sensor for a leaf spring arrangement, or a pressure sensor for a flexible air bellows. Other alternatives are also conceivable, such as e.g. load sensor connected to the specific spring arrangement.

According to an example embodiment, the spring arrangement may comprise a flexible bellows and the spring sensor may be a gas pressure sensor arranged within the flexible bellows for detecting a characteristic in the form of a gas pressure level of the flexible bellows.

Effect and features of the second aspect are largely analogous to those described above in relation to the first aspect. Hence, features of the first aspect are applicable also to the vehicle suspension system of the second aspect.

According to a third aspect, there is provided a vehicle comprising a vehicle suspension arrangement according to any one of the embodiments described above in relation to the second aspect, which vehicle suspension arrangement is arranged between a frame and a wheel axle of the vehicle.

According to a fourth aspect, there is provided a computer program comprising program code means for performing the steps of any one of the embodiments described above in relation to the first aspect when the program is run on a computer.

According to a fifth aspect, there is provided a computer readable medium carrying a computer program comprising program means for performing the steps of any one of the embodiments described above in relation to the first aspect when the program means is run on a computer.

Effects and features of the third, fourth and fifth aspects are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
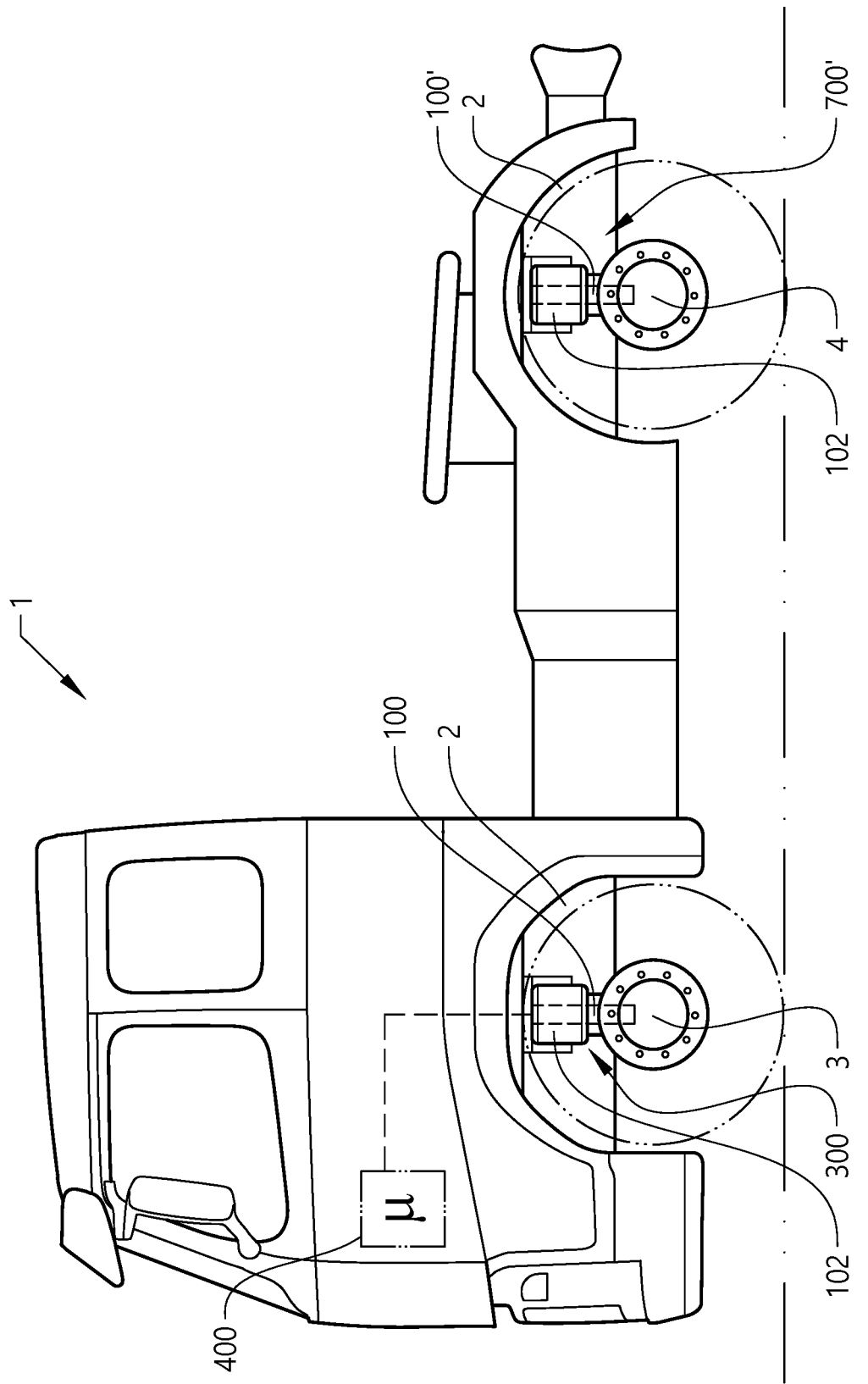
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description.

With particular reference to FIG. 1, there is provided a vehicle 1 in the form of a truck. The vehicle 1 comprises a front vehicle suspension arrangement 300 connecting the frame 2 to the front wheel axle 3, and a rear vehicle suspension arrangement 300' connecting the frame 2 to the rear wheel axle 4. Hence, each of the vehicle suspension arrangement 300, 300' is arranged to damp/absorb loads from the respective wheel axles during motion of the vehicle 1. The vehicle 1 may of course comprise more than two wheel axles. For simplicity, reference is only made to the front vehicle suspension arrangement 300, which is referred to as the vehicle suspension arrangement 300. As can be seen in FIG. 1, the vehicle suspension arrangement 300 comprises a vehicle shock absorber arrangement 100 and a spring arrangement, here illustrated as comprising a flexible bellows 102 into which gas, such as air, can be added or drained. Other spring arrangements are of course conceivable such as a leaf spring arrangement, etc. In further detail, the vehicle shock absorber arrangement 100 is connected between the wheel axle 3 and the flexible bellows 102, whereby the flexible bellows is connected to the frame 2.

Hence, the flexible bellows 102 is connected between the vehicle shock absorber arrangement 100 and the frame 2.

The vehicle 1 further comprises a control unit 400 arranged to receive control signals and deliver control signals for determining the functional status of the shock absorber arrangement 100 as will be described below. Although the control unit 400 is depicted as only being arranged in connection with the vehicle shock absorber arrangement 100 of the front wheel axle 3, it should be readily understood that the control unit is, or may be, arranged in connection with each of the shock absorber arrangements of the vehicle 1.

The control unit 400 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Figure 2:
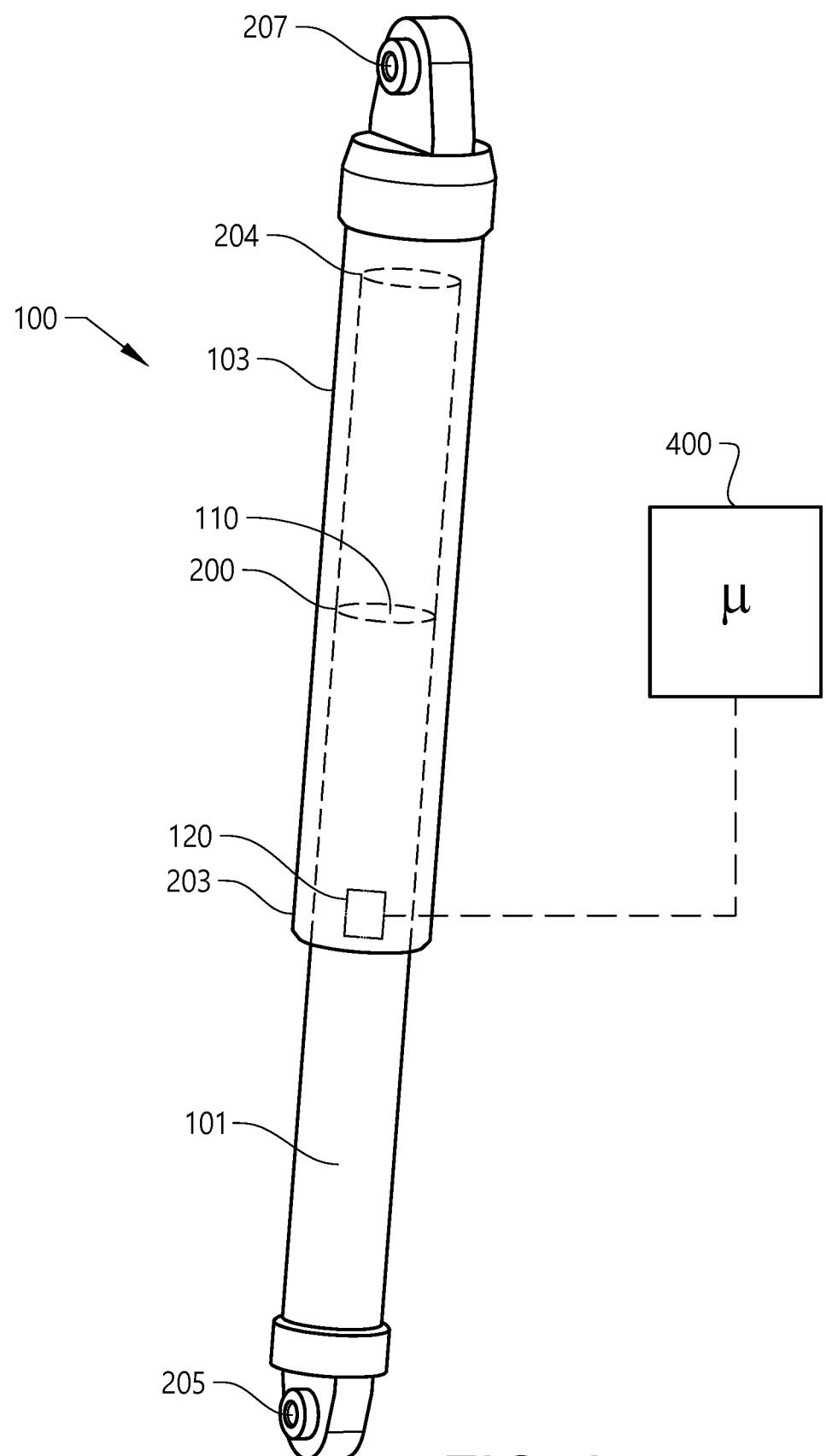
FIG. 2 is a perspective view of a shock absorber according to an example embodiment.

With reference to FIG. 2, the vehicle shock absorber arrangement 100 in FIG. 1 is depicted in further detail. As can be seen, the vehicle shock absorber arrangement 100 comprises an upper connecting portion 207 arranged for connection to the flexible bellows 102 depicted in FIG. 1, and a lower connecting portion 205 arranged for connection to the wheel axle. It should be readily understood that the vehicle shock absorber arrangement 100 must not be directly connected to the wheel axle, as a bracket or other component may be arranged between the shock absorber arrangement 100 and the wheel axle.

Furthermore, the shock absorber arrangement 100 comprises a shock absorber housing 103 and a piston 101 movable relative the shock absorber housing 103. As can be seen, the piston 101 is movable within the shock absorber housing 103, whereby the portion of the piston 101 arranged within the shock absorber housing 103 is illustrated with dashed lines. The shock absorber arrangement 100 is schematically illustrated and the skilled person understands that variations in design are conceivable. As is further depicted in FIG. 2, the shock absorber housing 103 comprises piston end positions 203, 204. In detail, the shock absorber housing 103 comprises an upper piston end position 204 and a lower piston end position 203. An end portion 110 of the piston 101 is thus movable within the shock absorber housing between the upper 204 and lower 203 piston end positions. Moreover, the position of the piston 101 within the shock absorber housing at vehicle stand still is denoted as 200 in FIG. 2. Hence, when the engine of the vehicle is turned on and the vehicle is standing still, ready for take off, the end portion 110 of the piston 101 is arranged at the position, denoted as the first position 200 within the shock absorber housing, which position is used in the examples described below in relation to the description of FIGS. 3-5.

Still further, the shock absorber arrangement 100 is connected to the control unit 400 described above. According to the example depicted in FIG. 2, the control unit 400 is connected to a piston position sensor 120. The piston position sensor 120 is arranged to determine a position of the piston 101 relative the shock absorber housing 103. The piston position sensor 120 is depicted as connected to the piston 101. However, other alternatives of determining the position of the vehicle shock absorber arrangement 100 are of course conceivable. For example, the position of the vehicle shock absorber arrangement 100 can be determined by e.g. detecting the position of the vehicle frame 2 relative to the wheel axle 3, which can be determined by an external level sensor connected to e.g. the chassis of the vehicle.

The control unit 400 thus receives signals relating to the position of the vehicle shock absorber arrangement 100. The control unit may also preferably receive signals relating to the load exposed to the shock absorber arrangement 100 during operation thereof. This load may be acquired by detecting the acceleration levels exposed to the shock absorber arrangement 100. This may be achieved by use of e.g. a suitable sensor (not shown).

Figure 3:
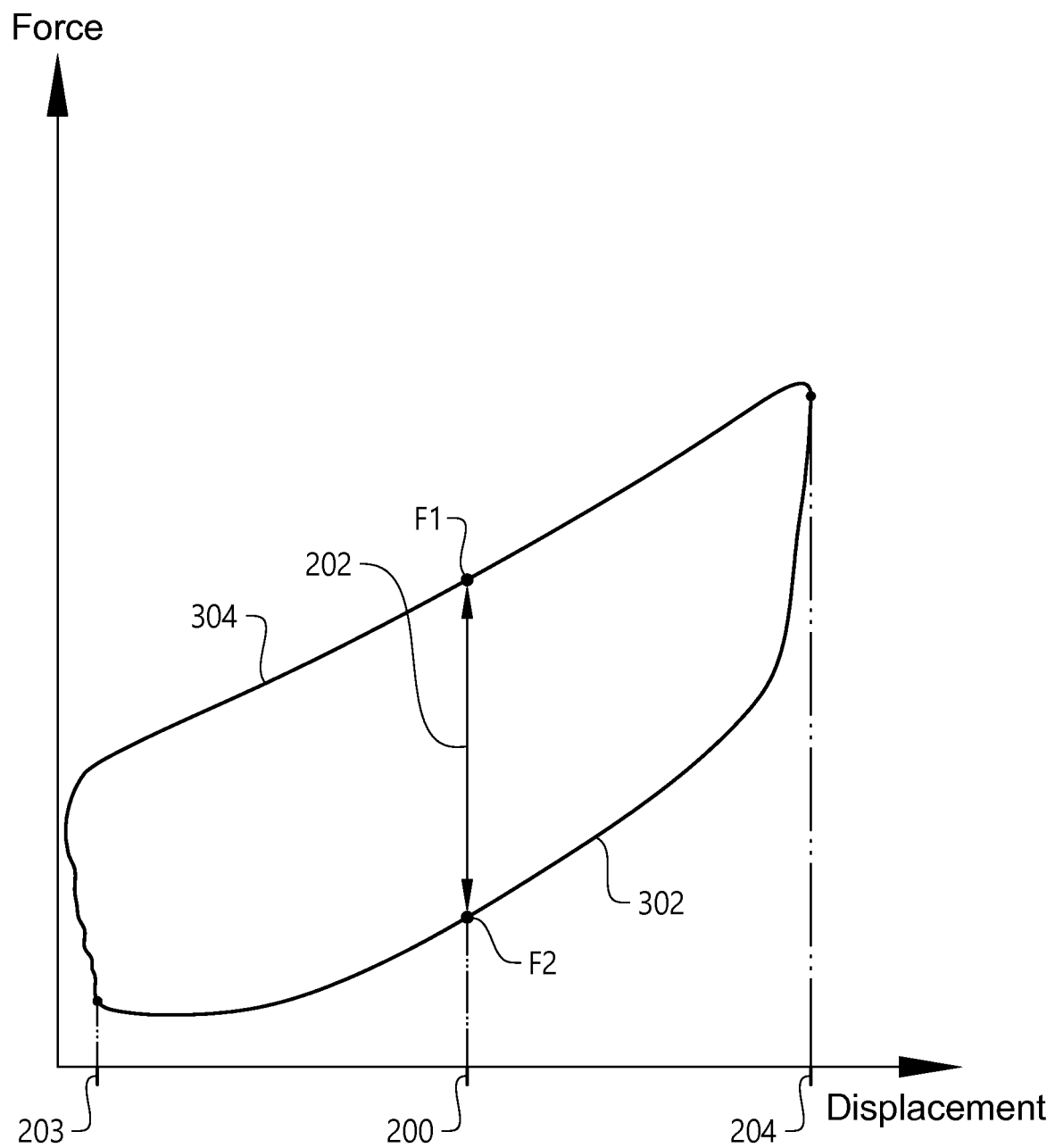
FIG. 3 is a graph illustrating the load characteristic of a shock absorber according to an example embodiment.
Figure 4:
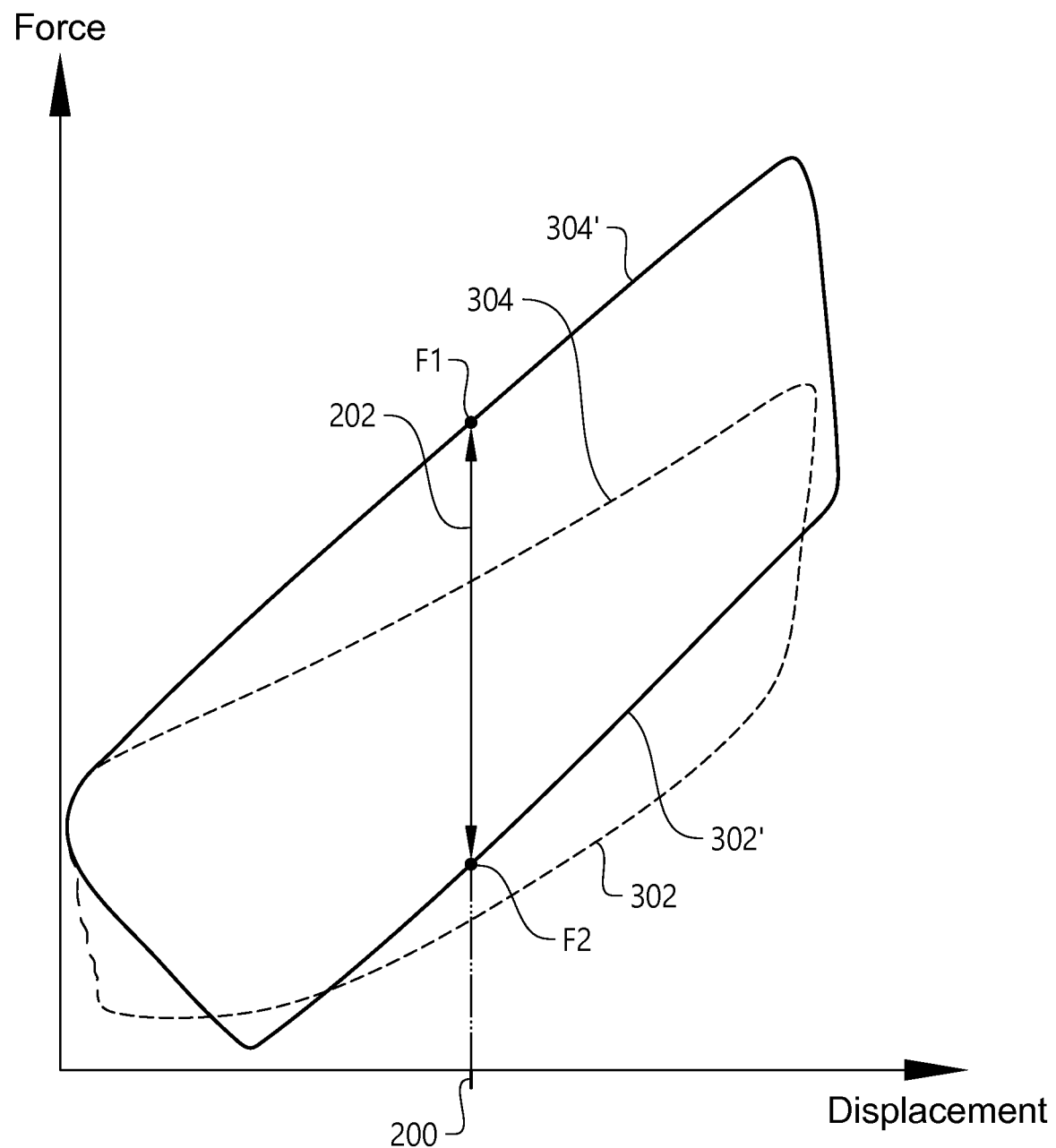
FIG. 4 is a graph illustrating the load characteristic of a shock absorber according to another example embodiment.

During operation, the shock absorber may be degraded after successive use. However, it may be difficult to determine how much the shock absorber arrangement has been degraded and when its operational life time has ended and it is time to replace the shock absorber with a new one. Reference is therefore made to FIGS. 3 and 4 which illustrate example embodiment for determining the functional status of the shock absorber arrangement.

Reference is firstly made to FIG. 3, which is a graph illustrating the load characteristic of the shock absorber arrangement 100 connected to a spring arrangement according to a first example embodiment. As can be seen in FIG. 3, the horizontal axis represents the displacement of the piston 101 within the shock absorber housing 103, while the vertical axis represents the force levels of the external force exposed to the shock absorber arrangement 100. The graph in FIG. 3 thus illustrates an example embodiment of the force/displacement characteristics of the shock absorber arrangement during compression and expansion of the shock absorber arrangement 100. In detail, FIG. 3 illustrates the upper 204 and lower 203 piston end positions, and the first position 200 of the piston. Hence, line 302 from the upper piston end position 204 to the lower piston end position 203 represents the movement of the piston 101 from the upper piston end position 204 to the lower piston end position 203, i.e. expansion 302 of the shock absorber arrangement 100. Line 304 from the lower piston end position 203 to the upper piston end position 204 on the other hand represents the movement of the piston 101 from the lower piston end position 203 to the upper piston end position 204, i.e. compression 304 of the shock absorber arrangement 100. As can be seen, the force values are higher for a given displacement during compression in comparison to expansion of the shock absorber arrangement 100 when connected to the spring arrangement.

During operation, i.e. when the shock absorber arrangement 100 is exposed to loading from the vehicle 1, a first force value F1 of the shock absorber arrangement 100 is determined when the piston 101 is arranged at the first position 200 in the compression stage. A second force value F2 of the shock absorber arrangement 100 is also determined when the piston 101 is arranged at the first position 200 in the expansion stage. Hence, the first F1 and second F2 force values are determined for substantially the same piston position within the shock absorber housing 103 during compression and during expansion of the shock absorber arrangement 100. A difference 202 between the first F1 and second F2 force values can thereafter be determined. Hereby, the hysteresis effect of the shock absorber arrangement can be determined, i.e. how much the force differs during compression in comparison to expansion.

FIG. 3 illustrates a first F1 and a second F2 force value for a single position 200 of the shock absorber arrangement 100. It should however be readily understood that the force values of each position from the lower piston end position 203 to the upper piston end position 204 may be acquired and evaluated.

The difference 202 between the first F1 and second F2 force values, i.e. the hysteresis, may then be compare to a predetermined threshold. The predetermined threshold thus preferably represents the hysteresis for a substantially new and unused shock absorber arrangement 100. It has been realized that a reduced difference between the first and second force values indicates that the shock absorber arrangement 100 is degraded, or is being degraded. Thus, if the determined difference between the first F1 and second F2 force values are below the predetermined threshold, the shock absorber arrangement is determined to be degraded. The threshold may be set differently such that the operator of the vehicle can be informed in advanced that the shock absorber is about to be degraded and that replacement is recommended within a near future. In such case, the predetermined threshold is set higher in comparison to a situation where the operator is notified when the shock absorber arrangement 100 is actually worn out and need immediate replacement.

The hysteresis effect may however also depend on the characteristic of the spring arrangement connected to the shock absorber arrangement 100. Thus, the hysteresis effect may depend on the gas pressure level within a flexible bellows connected to the shock absorber arrangement 100, or the vertical displacement of a leaf spring arrangement connected to the shock absorber arrangement 100. The following will describe the impact on the hysteresis effect when the shock absorber arrangement 100 is connected to the flexible bellows described above in relation to the description of FIG. 1.

The graph illustrated in FIG. 3 is depicted with dashed lines in FIG. 4 in order to simplify the illustration of the difference between the embodiment in FIG. 3 and the embodiment in FIG. 4. The force/displacement characteristic of the embodiment in FIG. 3 is representative for a first gas pressure level within the flexible bellows, while the force/displacement characteristic of the embodiment in FIG. 4 is representative for a second gas pressure level within the flexible bellows. It should be readily understood that the illustration in FIG. 4 is schematic and may take other form and shapes.

As can be seen in FIG. 4, the force characteristic of the shock absorber arrangement 100 differs from the force characteristic depicted in FIG. 3. In detail, the force gradient during both compression 304' and expansion 302' is steeper for the second gas pressure level in comparison to the corresponding force gradient during compression 304 and expansion 302 for the first gas pressure level.

As can be seen in FIG. 4, the difference 202 between the first F1 and second F2 values is higher for the second gas pressure level within the flexible bellows in comparison to the first gas pressure level. Hereby, when comparing the difference 202 with the predetermined threshold, the predetermined threshold should be specific for the second gas pressure level for improving the accuracy of the measurements.

Other aspect may also affect the hysteresis effect described above, such as the frequency of the oscillating force exposed to the shock absorber arrangement 100. In such situation, the predetermined threshold should be specific for such frequency level.

The predetermined thresholds may preferably be determined from measurements of a substantially new and fully functional shock absorber arrangement. In the case of FIG. 4, measurements made for the substantially new and fully functional shock absorber arrangement should be made when the shock absorber arrangement is connected to a flexible bellows with a gas pressure level corresponding to the second gas pressure level.

Figure 5:
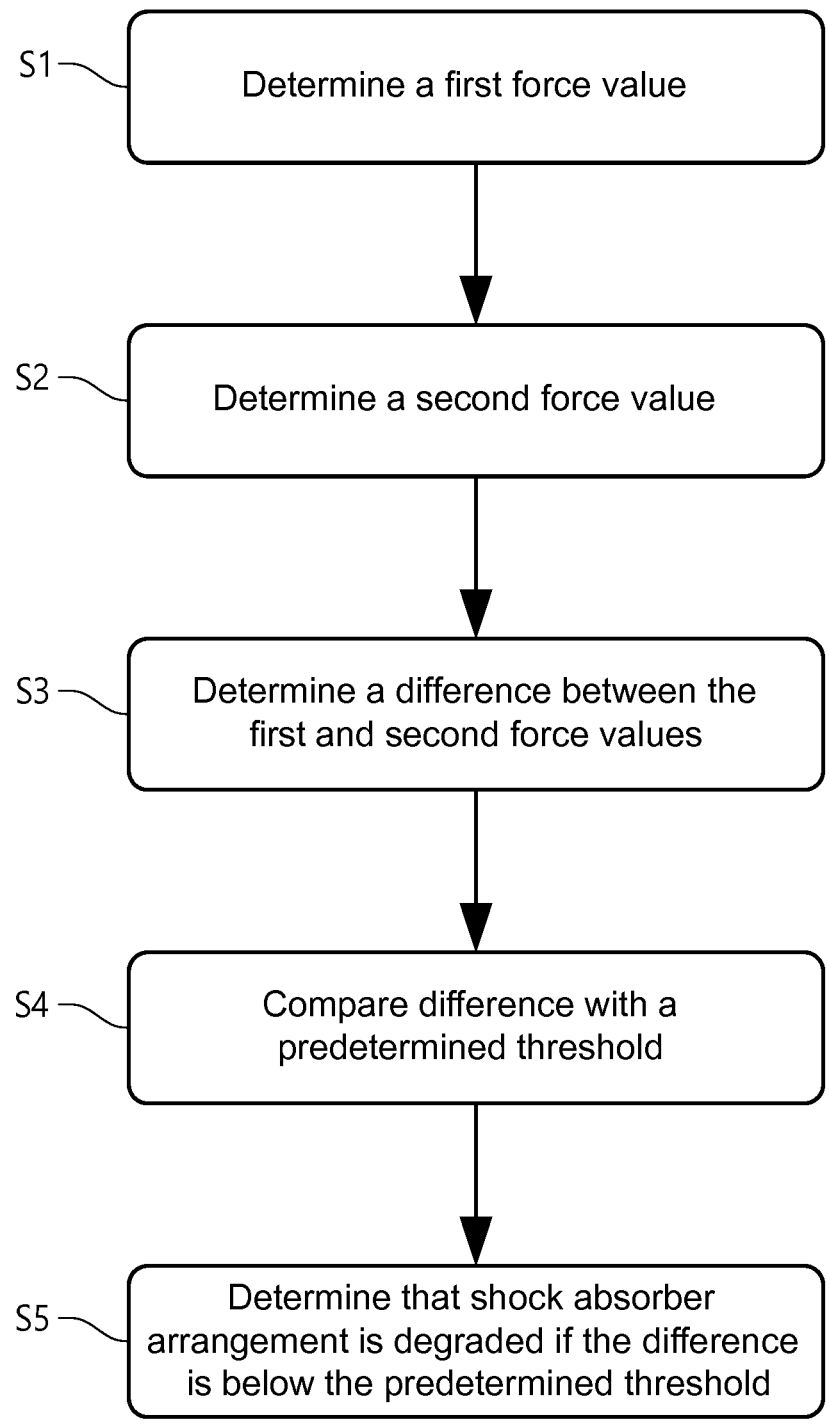
FIG. 5 is a flow chart of a method for determining the functional status of a shock absorber according to an example embodiment.

In order to sum up, reference is made to FIG. 5 which is a flow chart of a method for determining the functional status of the shock absorber arrangement 100 according to an example embodiment.

During operation of the vehicle, a first force F1 of an external force exposed to the shock absorber arrangement 100 is determined S1. The first force value F1 is determined when the shock absorber arrangement 100 is arranged at the first position 200 during compression thereof. Preferably, the first force value F1 is determined when the piston 101 is arranged at the first position 200 during compression.

Similarly, a second force value F2 of the external force exposed to the shock absorber arrangement 100 is determined S2. The second force value F2 is determined when the shock absorber arrangement is arranged at the first position 200 during expansion thereof. A difference 202 between the first F1 and second F2 force values can thereafter be determined S3. This difference 202 is compared S4 with a predetermined threshold. If the difference 202 between the first and second force values is below the predetermined threshold, the shock absorber arrangement can be determined S5 to be degraded.

It is to be understood that the present invention is not limited to the embodiments described above and illustrated in the drawings; rather, the skilled person will recognize that many changes and modifications may be made within the scope of the appended claims.

The invention claimed is:

1. A method for determining a functional status of a vehicle shock absorber arrangement arranged between a frame and a wheel axle of a vehicle, the vehicle shock absorber arrangement being compressible and expandable during operation for absorbing motions from the wheel axle, the method comprising:
    determining a first force value of an external force exposed to the shock absorber arrangement, the first force value being determined when the shock absorber arrangement is arranged at a first position during compression of the shock absorber arrangement;
    determining a second force value of the external force exposed to the shock absorber arrangement, the second force value being determined when the shock absorber arrangement is arranged at the first position during expansion of the shock absorber arrangement;
    determining a difference between the first and second force values;
    comparing the difference between the first and second force values with a predetermined threshold; and
    determining that the shock absorber arrangement is degraded if the difference between the first and second force values is below the predetermined threshold.

2. The method of claim 1, wherein the shock absorber arrangement comprises a piston movable within a shock absorber housing of the shock absorber arrangement, wherein the first position of the shock absorber arrangement is a first piston position of the piston within the shock absorber housing.

3. The method of claim 2, wherein the piston is movable within the shock absorber housing between respective piston end positions within the shock absorber housing, wherein the first piston position is a non-end position within the shock-absorber housing.

4. The method of claim 1, further comprising:
- determining a position of the shock absorber arrangement when the vehicle is arranged at stand still; and
- setting the first position to the position of the shock absorber arrangement at vehicle stand still.

5. The method of claim 1, wherein the shock absorber arrangement is connected to a vehicle spring arrangement, wherein the method further comprises:
- determining a characteristic of the vehicle spring arrangement;
- determining the predetermined threshold based on the characteristic of the vehicle spring arrangement; and
- comparing the difference between the first and second force values with the predetermined threshold specific for the characteristic of the vehicle spring arrangement.

6. The method of claim 5, wherein the spring arrangement comprises a flexible bellows and the characteristic of the spring arrangement is a measured gas pressure level within the flexible bellows.

7. The method of claim 5, wherein the spring arrangement comprises a leaf spring arrangement and the characteristic of the spring arrangement is a vertical displacement position of the leaf spring arrangement.

8. The method of claim 1, wherein the external force is an oscillating force acting on the shock absorber arrangement, wherein the method further comprises the steps of:
- determining a frequency level of the oscillating force acting on the shock absorber arrangement;
- determining the predetermined threshold based on the frequency level of the oscillating force; and
- comparing the difference between the first and second force values with the predetermined threshold specific for the frequency level of the oscillating force.

9. The method of claim 1, wherein a plurality of first force values are determined for a plurality of positions of the shock absorber arrangement during compression of the shock absorber arrangement, and a plurality of second force values are determined for the same plurality of positions of the shock absorber arrangement during expansion of the shock absorber arrangement.

10. A vehicle suspension system of a vehicle, the suspension system comprising a vehicle shock absorber arrangement connectable between a frame and a wheel axle of a vehicle, the vehicle shock absorber arrangement being compressible and expandable during operation for absorbing motions from the wheel axle; and a control unit connected to the vehicle shock absorber arrangement, wherein the control unit is configured to:
- determine a first force value of an external force exposed to the shock absorber arrangement, the first force value being determined when the shock absorber arrangement is arranged at a first position during compression of the shock absorber arrangement;
- determine a second force value of the external force exposed to the shock absorber arrangement, the second force value being determined when the shock absorber arrangement is arranged at the first position during expansion of the shock absorber arrangement;
- determine a difference between the first and second force values;
- compare the difference between the first and second force values with a predetermined threshold; and
- determine that the shock absorber arrangement is degraded if the difference between the first and second force values is below the predetermined threshold.

11. The vehicle suspension system of claim 10, further comprising a spring arrangement connectable between the vehicle shock absorber arrangement and the frame of the vehicle, and a spring sensor connected to the control unit and arranged to detect a characteristic of the spring arrangement, wherein the control unit is further configured to:
- receive a signal from the spring sensor indicative of the characteristic of the spring arrangement; and
- determine the predetermined threshold based on the characteristic of the spring arrangement.

12. The vehicle suspension system of claim 11, wherein the spring arrangement comprises a flexible bellows and the spring sensor is a gas pressure sensor arranged within the flexible bellows for detecting a characteristic in the form of a gas pressure level of the flexible bellows.

13. The vehicle suspension arrangement of claim 10, wherein the vehicle suspension system is arranged between the frame and the wheel axle of the vehicle.

* * * * *